C. H. POST.
LARD AND FLOUR MIXER.
APPLICATION FILED APR. 13, 1916.
1,218,116.
Patented Mar. 6, 1917.
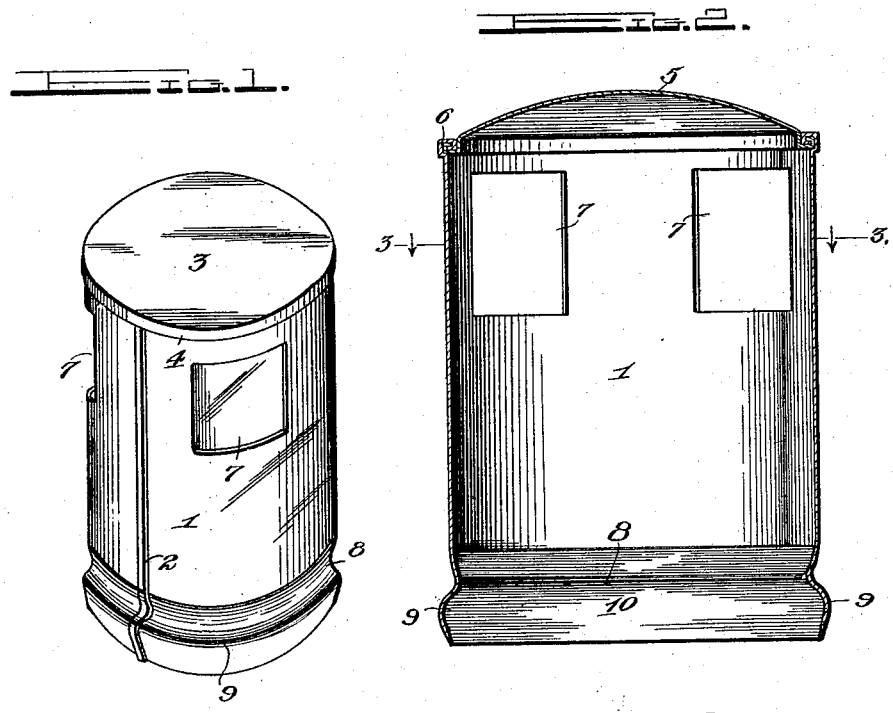
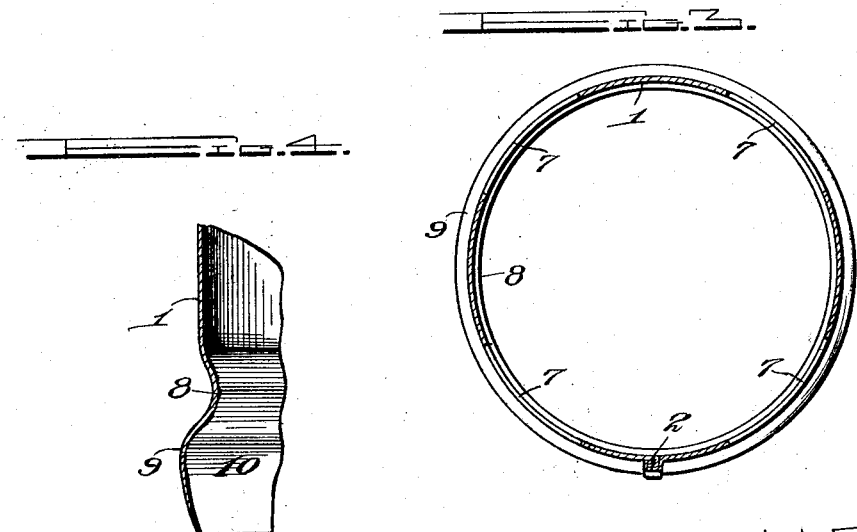
Inventor
CLARENCE H. POST,
By William C. Linton.
Attorney

UNITED STATES PATENT OFFICE.

CLARENCE H. POST, OF SEATTLE, WASHINGTON.

LARD AND FLOUR MIXER.

1,218,116.　　　　　Specification of Letters Patent.　　　Patented Mar. 6, 1917.

Application filed April 13, 1916. Serial No. 90,862.

*To all whom it may concern:*

Be it known that I, CLARENCE H. POST, a citizen of the United States, residing at Seattle, in the county of King and the State of Washington, have invented certain new and useful Improvements in Lard and Flour Mixers, of which the following is a specification.

The present invention relates to a new culinary article which is to be used for mixing lard and flour together in preparing the same to form a dough for bread, cakes or other similar pastry articles. It has been customary heretofore in mixing lard and flour together preparatory to forming a dough to use the fingers, which has been very disagreeable, and another way heretofore for mixing these ingredients has been done by using two knives which is a slow and tedious proposition.

The object of the invention is to provide a device which will readily and easily mix the lard into the flour without the lard coming in contact with the fingers of the operator.

A further object of the invention is to provide a kitchen utensil of this character which will be inexpensive in the cost of manufacture, durable and efficient in use, thereby rendering the same commercially desirable.

With the above and other objects in view the invention consists of the novel features of construction, combination, formation and arrangement of parts as will be hereinafter more fully described and particularly pointed out in the appended claims.

In the accompanying drawings:

Figure 1 is a perspective view embodying one form of the invention.

Fig. 2 is an enlarged vertical section embodying a slightly modified form of the invention.

Fig. 3 is a horizontal section taken on the line 3—3 of Fig. 2.

Fig. 4 is a detail sectional view.

Referring now more particularly to the drawing wherein like and corresponding parts are designated by similar reference characters throughout the several views.

The device comprises a body portion 1 formed of a sheet of metal rolled into cylindrical form, having its edges crimped together as at 2. The lower end of the body portion 1 is opened, but the upper end thereof is closed by means of a cover 3, which is crimped to the upper end of the body portion 1 as at 4. In Fig. 1 of the drawing, I have shown the top 3 of the utensil flat, but in Fig. 2 of the drawing the top 5 is dome-shaped, so that it will fit snugly within the palm of the hand, and thereby forming a better gripping handle. The top 5 as shown in Fig. 2 of the drawing is connected to the upper end of the body portion 1 by means of the crimped connection 6. Openings 7 are cut within the walls of the body portion 1 adjacent the upper end thereof for a purpose which will be later described.

The walls of the body portion 1 are bent inwardly adjacent to the lower edge, to form an annular inwardly extending ridge 8. Contiguous with this inwardly projecting ridge 8 the walls of the body portion are bent outwardly as at 9 to form an annular chamber 10 adjacent to the lower extremity of the body portion, and the lower extremities of the walls of the body portion are bent inwardly so that the lower edge will lie in a perpendicular plane with the walls of the body portion 1.

Preparatory to forming a dough flour and lard in the desired proportions are placed within a dish, bowl, or suitable receptacle and the mixer is then brought into play whereby the lard and flour will be mixed together. The mixer is forced downwardly into the flour and lard contained within the receptacle and the deflecting side walls 9 of the mixer will deflect the lard upwardly and outwardly where it will be caused to fall back due to its weight into the flour whereby the lard will be coated and the particles thereof will be so divided up that the lard and flour will be thoroughly mixed. By forcing the mixer into the flour and lard as contained within the receptacle the outer walls of the deflected portions 9 of the mixer will when inserted into the lard cause the same to be forced upwardly and outwardly where the lard due to gravity will fall back into the bowl upon the flour contained within the bowl or receptacle. Likewise the inner wall of the deflected portion 9 will cause the lard to be forced upwardly and the annular ridge 8 will further deflect the lard so that it will fall toward the center of the mixer into the flour contained within the receptacle and by continuously forcing the mixer into the flour and lard contained within the receptacle the particles of the lard will be thoroughly coated with the flour thereby properly mixing the flour and lard before the proper amount of water is to be mixed with the flour and lard when forming the dough. Due to the deflected portions 9 of the mixer the lard will not adhere thereto when it is forced within the lard contained in a receptacle but the lard will be forced upwardly and outwardly until it finally falls back into the bowl.

By using such a mixer the lard and flour will be thoroughly commingled together and the pastry articles resulting from the baking of the dough will be much lighter.

Whereas I have shown and described the preferred forms of carrying out my invention it is to be understood that no limitation is necessarily made to the precise structural details therein exhibited, but that the right is reserved to any changes, alterations, and modifications to which recourse may be had that come within the scope of the invention without departing from the spirit or sacrificing the efficiency of the same.

Having fully described my invention, what I claim as new and desire to secure by Letters Patent is:

1. A culinary article for mixing lard and flour comprising a cylindrical hollow body portion, an annular ridge formed therewith and the lower end of said body portion being bent inwardly forming an annular chamber between said ridge and the extreme lower end of said body portion for the purpose set forth.

2. A culinary article of the character set forth comprising a cylindrical hollow body portion, a closure for one end of said body portion forming a handle therefor, an inwardly projecting ridge formed with said body portion, the lower end of said body portion being deflected outwardly and then inwardly to form an annular chamber between said ridge and the lower edge of said body portion and the upper end of said body portion having a plurality of openings therein substantially as and for the purpose set forth.

3. An article of manufacture for mixing lard and flour comprising a hollow body portion having its lower end open, a closure for the opposite end thereof forming a handle, an annular inwardly projecting ridge formed with the body portion adjacent its lower end, an annular outwardly projecting flange, formed with the body portion below said inwardly projecting flange to form an annular chamber within the body portion, the lower edge of the body portion projecting inwardly from said outwardly extending ridge and terminating in a sharp edge lying in a vertical plane contiguous with the body portion whereby when the latter is forced within lard and flour the lard will be caused to be deflected upwardly and outwardly by said annular ridges and chamber and subsequently the lard will be caused to mix with the flour.

In witness whereof, I hereunto subscribe my name to this specification in the presence of two witnesses.

CLARENCE H. POST.

Witnesses:
 J. T. DORRIEN,
 PAUL HOLBROOK.

Copies of this patent may be obtained for five cents each, by addressing the "Commissioner of Patents, Washington, D. C."